United States Patent [19]

Danford

[11] 4,248,548
[45] Feb. 3, 1981

[54] SEWAGE DISPOSAL SYSTEM AND APPARATUS

[75] Inventor: Jack D. Danford, Watkins, Colo.

[73] Assignee: Danford-Champlin Farms, Ltd., Watkins, Colo.

[21] Appl. No.: 520,712

[22] Filed: Nov. 4, 1974

Related U.S. Application Data

[62] Division of Ser. No. 263,183, Jun. 15, 1972, Pat. No. 3,865,056.

[51] Int. Cl.³ .......................... A01C 23/02; E02D 3/10
[52] U.S. Cl. .......................................... 405/129; 111/7
[58] Field of Search .......................... 61/35; 111/7, 6; 47/DIG. 4; 405/128, 129

[56] References Cited

U.S. PATENT DOCUMENTS

| | | | |
|---|---|---|---|
| 1,038,084 | 9/1912 | Carroll | 111/7 |
| 3,557,685 | 1/1971 | Schroering | 61/35 |
| 3,578,348 | 5/1971 | Reinke | 111/7 |
| 3,693,838 | 9/1972 | Haker et al. | 222/178 |
| 3,753,409 | 8/1973 | Frazier | 111/7 X |
| 3,793,967 | 2/1974 | Van Den Berg | 111/7 |
| 3,842,764 | 10/1974 | Bauer | 111/7 |

FOREIGN PATENT DOCUMENTS 86348  5/1870  France .................................... 111/6

OTHER PUBLICATIONS

"An Economic and Permanent Solution to the *Sludge Problem*" Aug., 1970, A Proposal to the Metropolitan Denver Sewage Disposal District No. 1, pp. 2, 5, 13, 21-26, and appendix IV, pp. 1-5.

Primary Examiner—Alexander Grosz
Attorney, Agent, or Firm—Sheridan, Ross, Fields & McIntosh

[57] ABSTRACT

System includes transport means to carry sewage to holding pits or tanks in open areas remote from community and delivery from tanks to tunnels plowed in ground. Transport may be by tankers or pipeline. Tender tankers receive batches of sewage from storage tanks and deliver to field where tractors pull frames with depending plow members which produce tunnels in ground with narrow slashes or crevices extending to surface. Frames carry manifolds and discharge conduits to deliver sewage to tunnels. Tender tankers arranged beside tractors have supply conduits connecting them to manifolds, with pumps in conduits to produce continuous flow. Tankers travel in synchronism with tractors and deliver sewage to tunnels as they are formed. Compacting rollers pulled behind frames close crevices directly after they are formed by plow, and sewage is sealed into ground. The sewage provides moisture, nutrients, and humus at a proper sub-surface level to support crop growth for a year or more, and the same ground may be used for repeated disposals at suitable intervals.

10 Claims, 7 Drawing Figures

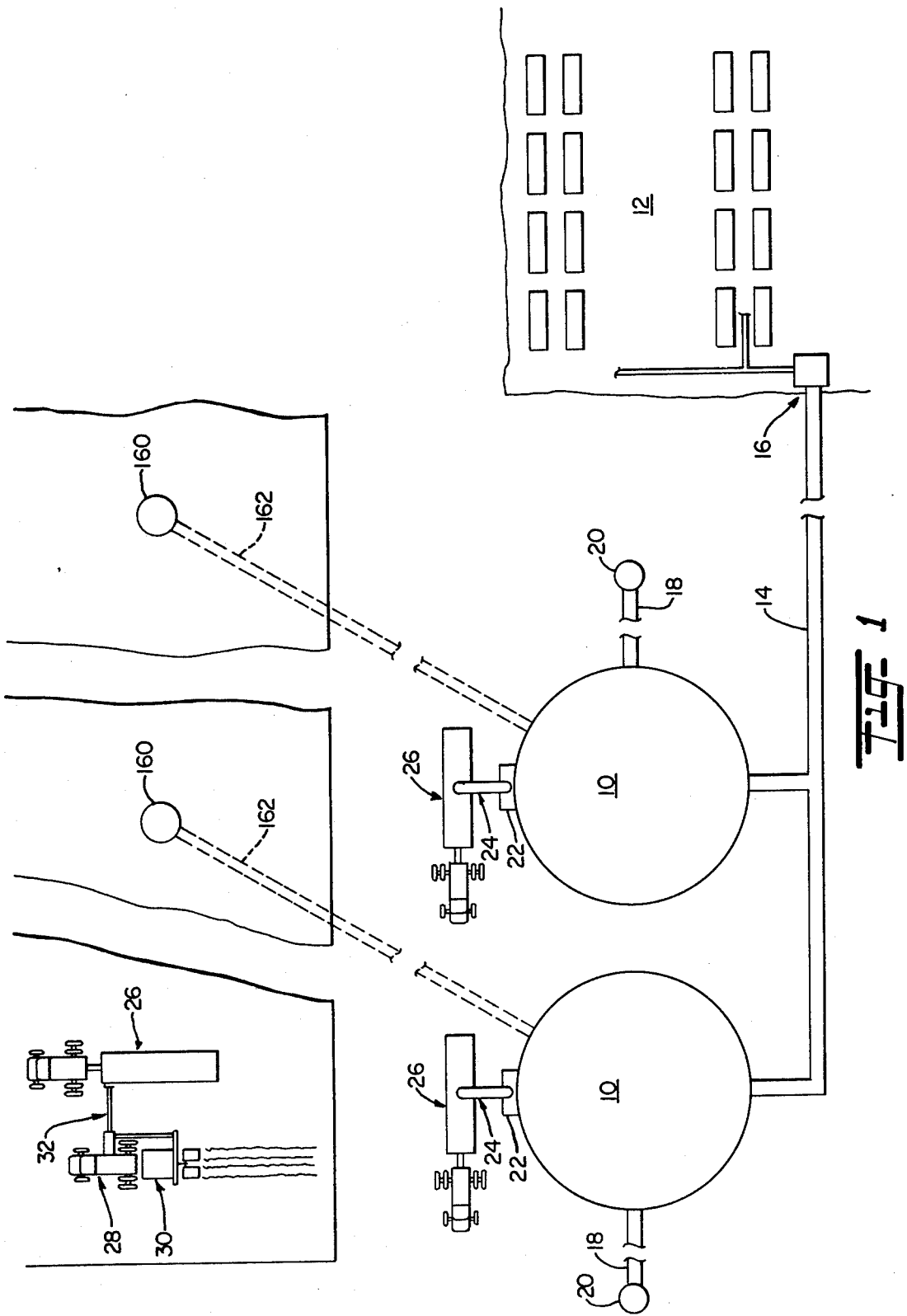

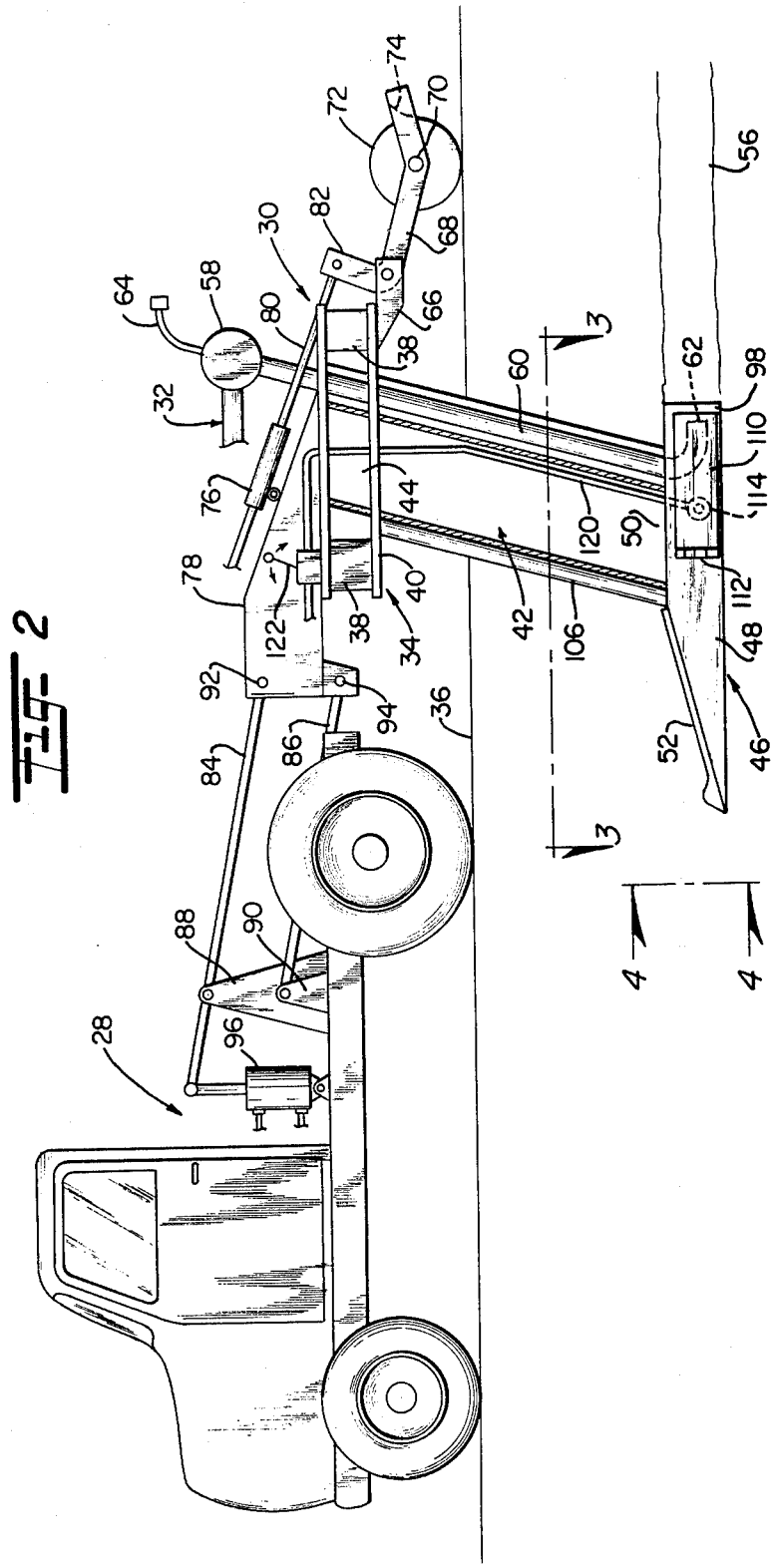

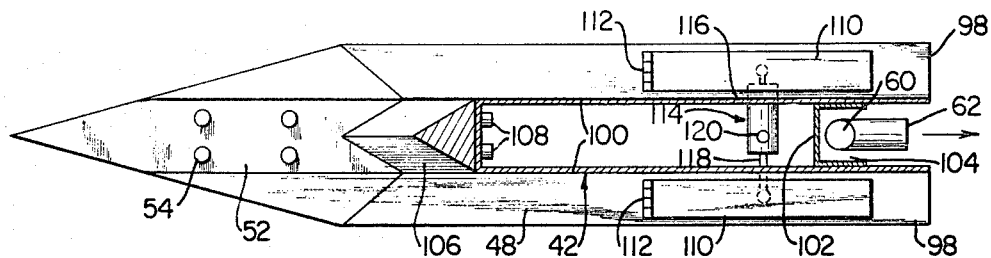
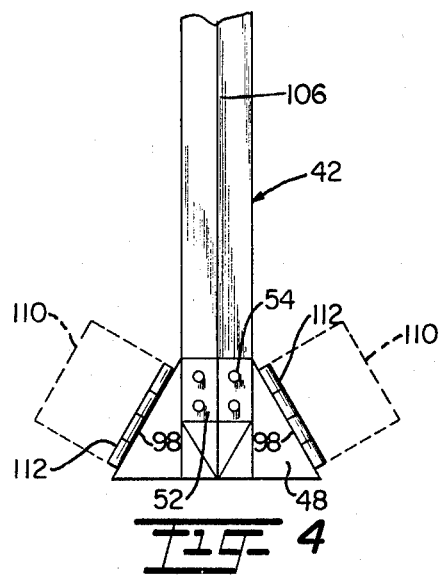
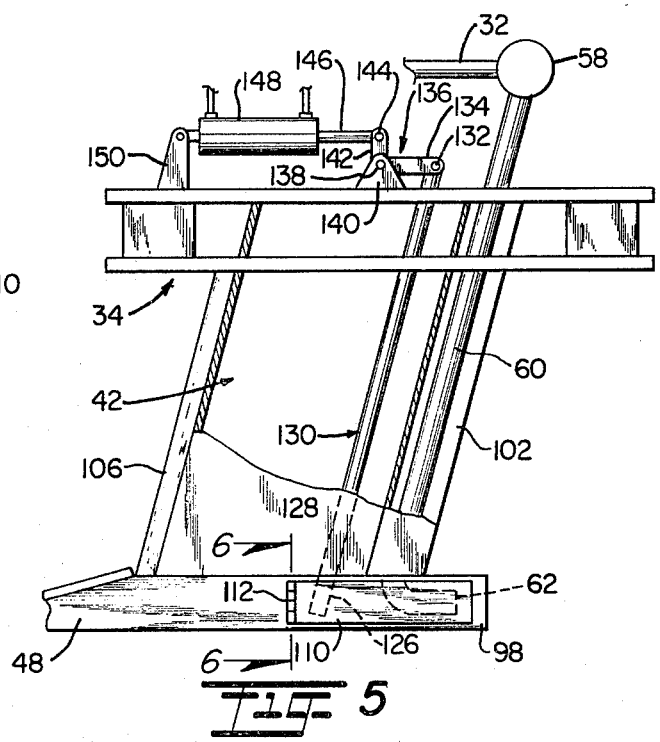
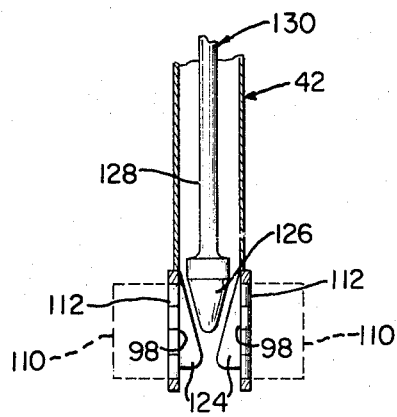

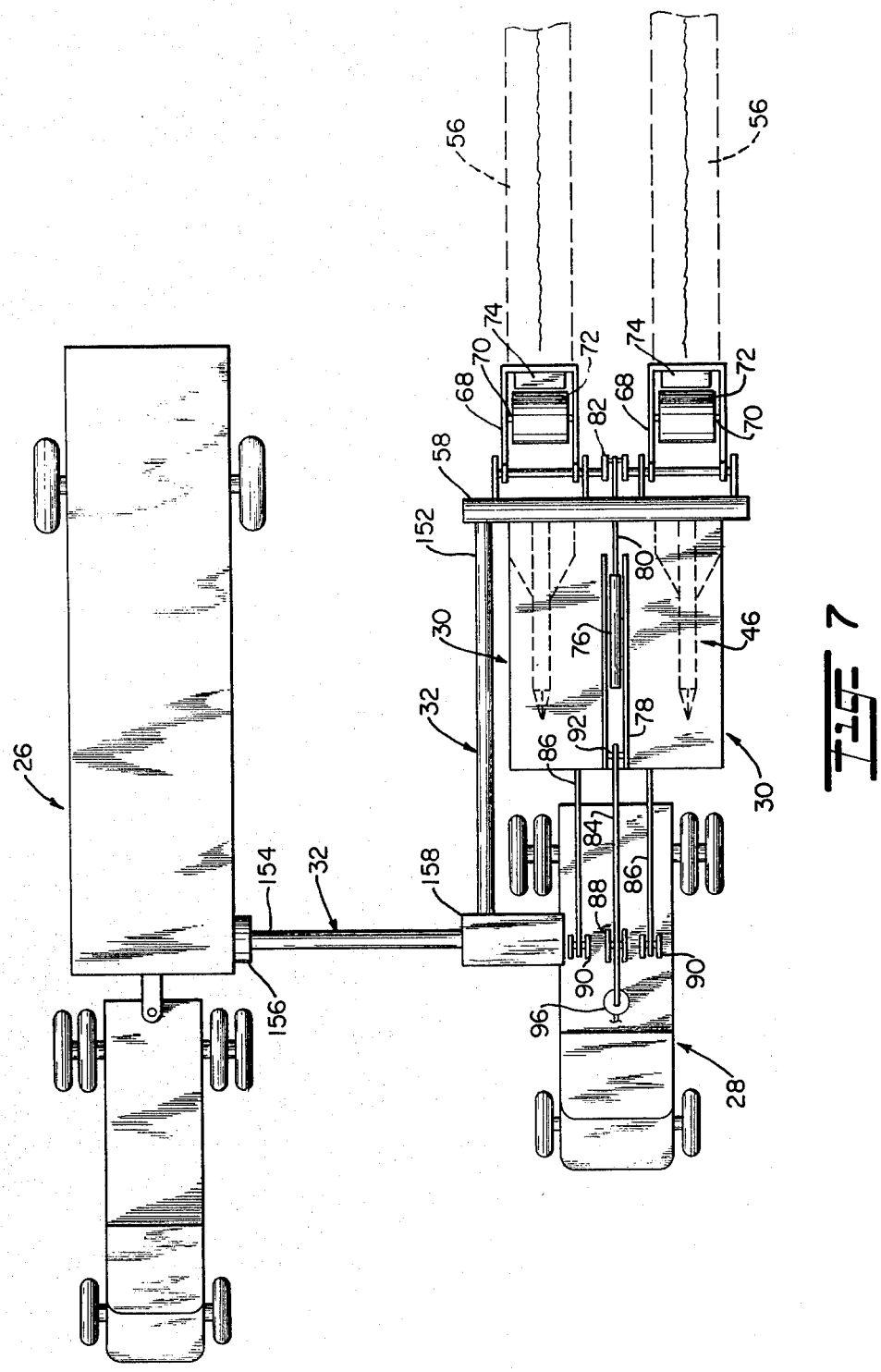

4,248,548

SEWAGE DISPOSAL SYSTEM AND APPARATUS

This is a division of application Ser. No. 263,183, filed June 15, 1972 now U.S. Pat. No. 3,865,056.

BACKGROUND OF THE INVENTION

This invention lies in the field of disposal of sewage from communities and is directed to a system, apparatus, and method which dispose of the sewage efficiently and without creating a nuisance while salvaging all of the beneficial components of the sewage for practical purposes and at the same time eliminating the cost and complication of elaborate sewage treatment plants and procedures.

The disposal of sewage has always been a problem, the magnitude of which varies with population density. Open pit dumping has been followed by septic tanks, dumping in streams, rivers, and oceans, and partial treatment and complete treatment usually followed by dumping in streams, etc., although in some cases the reconstituted water has been used for irrigation purposes.

The older systems polluted the ground, water, and air and were inadequate at best while the new systems reduced or eliminated pollution from sewage but called for large and elaborate treatment plants which are very expensive to build and operate. It is well known that the problem has become critical in all but the most sparsely populated areas. While bulk can be greatly reduced by storing liquid sewage in open pits until the water has evaporated, the odors emanating from such pits are disgreeable and they pose a serious health hazard. Moreover, the solids must still be buried in trenches by one of the many known "sanitary" land fill methods.

SUMMARY OF THE INVENTION

The present invention overcomes the difficulties mentioned above and provides a system and method which are suitable for disposing of sewage from smaller communities and at least from the outlying areas of larger communities. In the latter case the burden on the treatment facilities for the central area is greatly reduced.

Generally stated, holding pits or tanks are located in an open area remote from a community, preferably where farming or ranching is already in effect or could be undertaken if growing conditions could be improved. A gathering zone at the community may be a storage tank or merely the terminus of the sewage system. The liquid sewage is transported from the gathering zone to the pits or tanks at the holding zone by mobile tankers of any type or by pipeline, depending on the economics of the particular situation. From the storage or holding tanks or reservoirs, the sewage is transported in batches by tender tankers to locations in the open area where disposal is about to be accomplished.

At any one such location, a tractor is provided to tow a sewage disposer which generally comprises a main frame, at least one narrow shank depending from the frame, and a plow member at the lower end of the shank which is substantially wider than the shank to form a tunnel of suitable cross section as the plow member is pulled through the ground at a selected distance beneath the surface. Preferably two or more shanks and plow members are carried by one frame. A manifold is carried by the frame and means are provided for discharging sewage from the manifold into the tunnel or tunnels. Preferably this takes the form of a conduit connected at its upper end to the manifold and having a dispensing port at its lower end to discharge into the tunnel behind the plow member. A supply conduit is connected at a first end to the manifold.

To carry out the operation, the tender tanker is arranged alongside the tractor and frame at a suitable distance and the second end of the conduit is connected to a discharge port on the tanker. A pump is incorporated in the conduit to produce a continuous flow of sewage from the tanker to the manifold and is preferably driven by a power takeoff on the tractor. The tractor and tanker then move forward in synchronism and sewage is discharged into the tunnel continuously to fill it as it is formed. A compacting roller mounted behind the frame closes the crevice made by the shank directly after it is formed so that the tunnel is sealed off and no odors or gases can escape.

In order to vary the cross section of the tunnel as desired, the width of the plow member foot is varied by providing members at each side which may be forced apart by suitable power operating means. In the preferred form these members are wings pivoted at their forward ends to the side walls of the foot, although they may take other forms if desired.

BRIEF DESCRIPTION OF THE DRAWING

Various other advantages and features of novelty will become apparent as the description proceeds in conjunction with the accompanying drawings, in which:

FIG. 1 is a schematic plan view of the system;

FIG. 2 is a schematic view in side elevation of the tractor and disposer in operation;

FIG. 3 is a sectional view taken on line 3—3 of FIG. 2;

FIG. 4 is a sectional view taken on line 4—4 of FIG. 2;

FIG. 5 is a partial schematic view in side elevation of a modified form of disposer;

FIG. 6 is a sectional view taken on line 6—6 of FIG. 5; and

FIG. 7 is a schematic plan view of the tractor, disposer and tanker in operative relation.

DESCRIPTION OF PREFERRED EMBODIMENTS

A sewage disposal system in accordance with the principles of the present invention is illustrated schematically in highly idealized form in FIG. 1, in which one or more large holding pits or tanks 10 are located in an open area remote from the community 12 which may be distant from a few miles to fifteen miles or more. While any type of transport means may be used, the means illustrated is a pipeline 14 extending from gathering zone 16 to tanks 10. The gathering zone may be a storage tank or merely the terminus of the sewer system. If the sewage is of such nature that it produces noxious odors or gases such as methane, the reservoirs are in the form of enclosed tanks connected by conduits 18 to flare pipes 20 where the emitted gas is burned. As is well known in the art, some of the water in the sewage may be removed, as by settling, at the gathering zone 16 and/or tanks 10 to reduce the bulk of the material to be handled. The resulting more concentrated sewage is commonly referred to as sewage sludge. Thus, the method disclosed herein is equally applicable to disposal of raw sewage or sewage sludge.

Each tank or reservoir 10 is provided with a loading dock 22 having a dispensing conduit 24 to deliver a batch of sewage to a mobile tender tanker 26. Each filled tanker travels to a location in the open area, such as a farm or ranch layout, where a tractor 28 is connected to a disposer 30. Upon arrival, the tanker is stationed beside the tractor, and a supply conduit 32 connects the tanker to a manifold on the disposer. When flow is established through the conduit, the tractor and tanker move forward in synchronism and the disposer forms a tunnel, deposits the sewage in the tunnel and closes the crevice in the ground to seal the tunnel.

Details of construction of the tractor and disposer are schematically illustrated in FIGS. 2, 3, and 4. The disposer includes a main frame 34 which may be an open structure located in a generally horizontal plane and positioned at a selected level above the surface of the ground 36. Beams 38 extend laterally and are connected by a suitable number of longitudinal stringers 40 to form a support for the other components. Several plowing devices may be arranged in laterally spaced relation across the extent of the frame but only one is shown for clarity.

A shank 42 is fixedly secured at its upper end 44 to the frame and depends downward and preferably somewhat forward to penetrate the ground to the desired depth. A plow member 46 has an elongate foot 48 which is secured to the lower end 50 of the shank and extends a substantial distance forward thereof. The foot is tapered to converge forward as best seen in FIG. 3 and is provided with an elongate detachable ground-breaking tooth 52 secured to it by fasteners 54. As the main frame is pulled forward by tractor 28, the plow member, which is of substantially greater width than the shank, forms a tunnel 56 and the shank forms a narrow crevice, not shown, from the tunnel to the surface of the ground.

A manifold 58 extends laterally across the aft portion of the frame and is flow-connected to a depending discharge conduit 60 for each plowing device. Conduit 60 extends in a generally upright direction adjacent to the aft edge of shank 42 and is secured to the shank and the frame. At its lower end it is provided with a dispensing port 62 which preferably faces rearwardly to discharge the sewage into the tunnel as the latter is formed. Supply conduit 32 provides a continuous flow through the manifold. A flushing conduit 64 is flow-connected to the manifold at one end adjacent to the supply conduit and is adapted to be connected to a source of high pressure water for flushing out the manifold and discharge conduit on occasion.

Brackets 66 extend rearward from the lower aft edge of the main frame to pivotally mount wheel carriers 68. The latter are provided with transverse axles 70 for compression rollers 72, and also carry wheel scrapers 74 which keep the rollers cleared of an accumulation of dirt. A hydraulic servo motor 76, powered by the hydraulic power system of the tractor, is mounted on brackets 78 and provided with a piston rod 80 connected to horns 82 on wheel carriers 68 to raise and lower the rollers and vary the pressure applied to the ground. It will be seen that the rollers set to compress the ground and close the crevices formed by the shanks directly after their formation to seal the tunnels before any gases or odors can escape.

Parallelogram type support bars 84 and 86 are pivotally mounted on pylons 88 and 90 on the tractor and at their aft ends are pivotally connected to brackets 78 at 92 and 94 to support the frame and plowing device and to position them at any desired elevation. Bar 84 extends forward at its pivotal mounting and is connected to servo motor 96 for actuation of the supporting linkage.

Side walls or plates 98 of foot 48 extend rearward of the aft end of the shank and to each side of the dispensing port 62 of the discharge duct 60 to protect it against damage and to prevent the intrusion of dirt which might plug the port. Shank 42 may be solid but preferably is formed with laterally spaced side walls 100 to define a hollow body. Partition 102 extends between the side walls forward of their aft edges to form a rearwardly opening channel 104, and conduit 60 is located within this channel to protect it against displacement and damage. While shank 42 may have an integral leading edge sharpened to cut through the soil, it is here provided with a separate elongate leading edge member 106 of generally triangular cross section detachably secured by fasteners 108 for sharpening and replacement.

It is difficult to work a very wide plow member down into the ground to commence the tunneling operation. Therefore the foot 48 of the plow member is provided with expanding members which may be retracted while the plow member is being lowered to working position and then forced apart laterally to increase the effective cross section of the plow member and produce a tunnel of the desired size. As seen in FIGS. 2, 3, and 4, such members take the form of wings 110 pivotally mounted at their leading edges by hinges 112 to the side walls 98 of the foot on generally upright axes to swing laterally. Side walls 98 preferably diverge downward and therefore the aft ends of the wings also swing upward to some extent. Thus they exert a down load on the plowing device to assist in maintaining it at the desired level.

The means to control the divergence of the wings comprises a servo motor 114 arranged transversely between them with cylinder 116 connected to one wing and piston rod 118 connected to the other wing. Conduit means 120 extends from the servo motor up within the shank 42 to a hydraulic power pack 122 supplied by the hydraulic power system of the tractor.

A modified mechanism for controlling the divergence of the wings is illustrated in FIGS. 5 and 6. Instead of a servo motor located between the wings, a cam follower 124 is mounted on the inner side of each wing and a cam 126 is movably mounted to be driven between the cam followers to force the wings laterally apart. Cam 126 is mounted on the lower end 128 of actuator rod 130 which extends generally vertically up through the shank with its upper end pivotally connected at 132 to an arm 134 of bell crank 136, which is pivotally mounted at 138 on bracket 140. The other arm 142 of the bell crank is pivotally connected at 144 to piston rod 146 of the hydraulic servo motor 148 pivotally mounted on bracket 150. The servo motor is supplied by the hydraulic power system of the tractor.

FIG. 7 illustrates the relation of the tanker to the tractor and disposer during the disposal operation. A first end 152 of the supply conduit 32 is flow-connected to manifold 58 and the second end 154 is flow-connected to a port 156 on the tanker. Pumping means 158, incorporated in the conduit, is preferably mounted on the tractor and is driven by the tractor's power takeoff, not shown. The pump is operated continuously to fill the tunnels 56 at the same rate they are formed by plow members 46, and the two units move forward together at a rate of about two to four miles per hour, the rollers 72 closing the crevices above the tunnels directly after the shanks have passed.

A fleet of three to five tankers ensures that a full tanker will be available as soon as the previous tanker has been emptied even though the storage tank 10 is quite a distance away. Depending on the general size of the operation, which is related to the size of the community, equipment may be used which disposes of one hundred to 2000 gallons per minute. Since the disposal site may vary in area from a few thousand to as much as twenty thousand acres, some portions of the area may be so far from the main reservoir means that tanker haulage is impractical. In such cases, auxiliary loading stations 160 are provided at strategic locations as shown in FIG. 1 and are connected to the main reservoir means by auxiliary pipelines 162. Thus the haul for the tankers from the auxiliary loading stations to the operating locations of the tractors is reduced to a reasonable figure.

What is claimed is:

1. A system for disposing of sewage from a community comprising:

a sewage gathering zone adjacent to the community including means for transporting sewage from the community to the sewage gathering zone;

reservoir means located at a transfer zone in an open area remote from the community;

means running between the gathering zone and the reservoir means to transport sewage from the gathering zone to the reservoir means;

means to produce elongate tunnels in the ground at the open area;

a plurality of batch transport means for running between the reservoir means and the location of the tunnels to transport sewage in batches sequentially from the reservoir means to the location of the tunnels and to then move across the open area; and means for moving across the open area to discharge the sewage sequentially from each of said batch transport means into the tunnels from one of said batch transport means as other of said batch transport means continue to move from said reservoir means to said elongate tunnels.

2. A system as claimed in claim 1 wherein:

the tunnel producing means comprise main frames provided with depending plow structures having enlarged tunnel-forming lower ends, and tractors connected to the frames to pull the plow structures through the ground;

said means to discharge sewage comprises manifold and conduit means on said main frame to discharge sewage into the tunnels; and said batch transport means comprise mobile tender tankers to receive charges of sewage sequentially from the reservoir means, travel across ground to the location of the tunnel producing means, and sequentially deliver their contents to the manifolds of the discharge means.

3. A system as claimed in claim 2 wherein:

the tankers travel parallel to and laterally spaced from the tractors and main frames and in synchronism therewith; and conduit means are provided to extend between the tankers and manifolds to deliver sewage continuously to the manifold during conjoint travel of the tankers and tractors.

4. A system as claimed in claim 1 wherein:

auxiliary loading stations are located at spaced points in the open area remote from the reservoir means and pipe lines extend between the reservoir means and the loading stations to supply the latter, the auxiliary loading stations serving to supply the batch transport means at such spaced points to reduce travel distance and time.

5. A system as claimed in claim 1 wherein:

the means to transport sewage from the gathering zone to the reservoir means comprises a pipeline.

6. A method of disposing of sewage from a community, comprising gathering sewage at the community;

transporting the sewage to reservoir means in an open area remote from the community;

providing auxiliary loading stations at spaced points throughout the discharge area;

supplying sewage directly to the auxiliary stations from the reservoir means;

forming tunnels in the ground of the open area;

transporting the sewage in batches from the auxiliary stations to the location of the tunnels;

discharging the sewage into the tunnels; and closing the surface of the ground above the tunnels to prevent the escape of odors and noxious gases.

7. A system for disposing of sewage from a community comprising:

a sewage gathering zone adjacent to the community including means for transporting sewage from the community to the sewage gathering zone;

means to produce elongate tunnels in the ground in an open area remote from the community;

a plurality of self-propelled batch transport means for running between the sewage gathering zone and the location of the tunnels to transport sewage in batches sequentially from the sewage gathering zone to the location of the tunnels and to then move across the open area; and means for moving across the open area to discharge the sewage sequentially from each of said batch transport means into the tunnels from one of said batch transport means as said one of said batch transport means moves across the open area alongside said discharge means as other of said batch transport means continue to move from said sewage gathering means to said elongate tunnels.

8. A system as claimed in claim 7 wherein:

the tunnel producing means comprise main frames provided with depending plow structures having enlarged tunnel-forming lower ends and tractors connected to the frames to pull the plow structures through the ground;

said means to discharge sewage comprises manifold and conduit means on said main frame to discharge sewage into the tunnels; and said batch transport means comprise self-propelled mobile tender tankers to receive charges of sewage sequentially from the sewage gathering zone, travel across ground to the location of the tunnel producing means, and sequentially deliver their contents to the manifolds of the discharge means as both of said discharge means and said tankers move together across the open area.

9. A method of disposing of sewage from a community, said method comprising the steps of:

transporting sewage from the community to a gathering zone;

producing elongate tunnels in the ground at an open area remote from the community by means of a plow structure pulled through the ground by a tractor;

transporting sewage from the gathering zone to the location of the tunnels sequentially in batches in self-propelled mobile tender tankers;

sequentially moving the mobile tender tankers alongside the tractor as the tractor moves across the open area; and transferring sewage from each mobile tender tanker into the tunnels as both the tractor and the mobile tender tanker move across the field to deposit sewage into each tunnel as it is formed by the plow structure.

10. A method, as claimed in claim 9, including the further steps of:

connecting each tanker in sequence to the plow structure;

pumping sewage from each tanker to the plow structure; and depositing the sewage from the plow structure into the elongate tunnels as the tunnels are formed by the plow structure.

* * * * *